US012590924B2

(12) United States Patent     (10) Patent No.:    US 12,590,924 B2
Ogawa et al.                      (45) Date of Patent:       Mar. 31, 2026

(54) ELECTROPHORESIS APPARATUS AND ELECTROPHORESIS METHOD

(71) Applicant: Hitachi High-Tech Corporation, Tokyo (JP)

(72) Inventors: Mima Ogawa, Tokyo (JP); Takahide Yokoi, Tokyo (JP)

(73) Assignee: Hitachi High-Tech Corporation, Tokyo (JP)

( * ) Notice:    Subject to any disclaimer, the term of this patent is extended or adjusted under 35 U.S.C. 154(b) by 322 days.

(21) Appl. No.:    18/566,889

(22) PCT Filed:    Jun. 28, 2021

(86) PCT No.:    PCT/JP2021/024357
§ 371 (c)(1),
(2) Date:    Dec. 4, 2023

(87) PCT Pub. No.: WO2023/275933
PCT Pub. Date: Jan. 5, 2023

(65)    Prior Publication Data
US 2024/0272118 A1    Aug. 15, 2024

(51) Int. Cl.
*G01N 27/447*    (2006.01)
(52) U.S. Cl.
CPC .  *G01N 27/44756* (2013.01); *G01N 27/44721* (2013.01)
(58) Field of Classification Search
CPC ....... G01N 27/44756; G01N 27/44721; G01N 27/447; C12M 1/34
See application file for complete search history.

(56)    References Cited

U.S. PATENT DOCUMENTS 5,449,446  A     9/1995  Verma et al.
6,264,814  B1    7/2001  Lange
(Continued)

FOREIGN PATENT DOCUMENTS

JP        8-327595  A    12/1996
JP    2004-290109  A    10/2004
(Continued)

OTHER PUBLICATIONS

International Search Report (PCT/ISA/210) issued in PCT Application No. PCT/JP2021/024357 dated Sep. 14, 2021 with English translation (4 pages).
(Continued)

*Primary Examiner* — Luan V Van
*Assistant Examiner* — Randall Lee Gamble, Jr.
(74) *Attorney, Agent, or Firm* — Crowell & Moring LLP

(57)    ABSTRACT

An electrophoresis apparatus includes a separation medium for electrophoretically separating a biological substance, a buffer solution tank containing a buffer solution, a recovery chamber for recovering a target biological substance, a separation wall separating the buffer solution tank and the recovery chamber, the separation wall controlling a flow of a buffer solution between the buffer solution tank and the recovery chamber according to a water level of the buffer solution, a position detector that detects a position of the target biological substance that is electrophoresed in the separation medium, and a water level control unit that controls the water level of the buffer solution in the buffer solution tank according to the position of the target biological substance.

9 Claims, 6 Drawing Sheets

(56)     References Cited

U.S. PATENT DOCUMENTS

| 9,719,961 B2 | 8/2017 | Sabin et al. |
| 2006/0086613 A1* | 4/2006 | Yamamoto ....... G01N 27/44743 |
| | | 204/603 |
| 2008/0057557 A1* | 3/2008 | Margalit ............ G01N 27/4473 |
| | | 435/173.9 |
| 2011/0114485 A1* | 5/2011 | Sakairi ............. G01N 27/44773 |
| | | 204/600 |
| 2016/0370319 A1 | 12/2016 | Molho et al. |
| 2022/0260523 A1 | 8/2022 | Ogwa et al. |

FOREIGN PATENT DOCUMENTS

| JP | 2006-177732 A | 7/2006 |
| JP | 2010-502962 A | 1/2010 |
| JP | 2018-523094 A | 8/2018 |
| JP | 2021-1773 A | 1/2021 |

OTHER PUBLICATIONS

Japanese-language Written Opinion (PCT/ISA/237) issued in PCT Application No. PCT/JP2021/024357 dated Sep. 14, 2021 with English translation (6 pages).

* cited by examiner

*FIG. 3*

ELECTROPHORESIS APPARATUS AND ELECTROPHORESIS METHOD

TECHNICAL FIELD

The present invention relates to an electrophoresis apparatus and an electrophoresis method using the same. As an example, the present invention relates to a method for easily recovering only a target substance as a high-purity and high-concentration recovery liquid from some biological substances using electrophoresis.

BACKGROUND ART

A gel electrophoresis method is a method for analyzing a biological substance such as a nucleic acid or a protein by utilizing a phenomenon that when an electric field is applied to a charged substance, the substance moves toward an electrode of opposite polarity. In general, an electrophoresis gel such as an agarose gel or an acrylamide gel is used as a support of a biological substance. Since the movement speed in the electrophoresis gel varies depending on the molecular weight of the biological substance, the biological substance is separated as a band that differs for each molecular weight. Since the gel electrophoresis method has high resolution for separation of a biological substance, the gel electrophoresis method is also employed for separating and recovering a biological substance having a target molecular weight from a biological substance having another molecular weight.

As a method for recovering a biological substance having a target molecular weight, a method is generally employed in which a target band separated by electrophoresis is excised together with a surrounding electrophoresis gel, and the biological substance is recovered from the excised electrophoresis gel. However, when the biological substance is recovered from the excised electrophoresis gel, there is a problem that the concentration of the biological substance changes or a process for the excision is additionally required.

As a method for recovering a target biological substance simultaneously with electrophoresis without the need to excise an electrophoresis gel, for example, PTLs 1 and 2 disclose that a recovery chamber for a biological substance is provided in an electrophoresis gel in advance. A method for providing the recovery chamber for a biological substance has an advantage that there is no possibility of contamination because unnecessary substances that are electrophoresed earlier than a target biological substance pass through the recovery chamber and continue to be electrophoresed, but for the same reason, the target biological substance also easily passes through the recovery chamber, and there is a problem that a high recovery rate of the target biological substance cannot be expected.

Similarly, as a method for recovering a target biological substance simultaneously with electrophoresis, for example, PTL 3 discloses a method in which a flow path of electrophoresis is bifurcated, only a target biological substance is moved to a recovery chamber by switching of an electrode, and a polymer is trapped using a recovery membrane.

Similarly, as a method for recovering a target biological substance simultaneously with electrophoresis, for example, PTL 4 discloses a method for trapping a polymer using a recovery chamber in which a recovery membrane is installed.

Similarly, as a method for recovering a target biological substance simultaneously with electrophoresis, for example, PTL 5 discloses a method in which a recovery chamber in which a recovery membrane is installed is inserted near a target band of an electrophoresis gel to trap a polymer.

CITATION LIST

Patent Literatures

PTL 1: JP 2004-290109 A
PTL 2: JP 2010-502962 A
PTL 3: U.S. Pat. No. 9,719,961 B
PTL 4: U.S. Pat. No. 6,264,814 B
PTL 5: JP H08-327595 A

SUMMARY OF INVENTION

Technical Problem

However, the conventional configurations have a problem that it is difficult to improve the recovery rate of a target biological substance and to stably perform electrophoresis.

For example, in the configurations in PTLs 1 and 2, since a hole is formed in the middle of the gel, the biological substance that has reached the recovery chamber continues to be electrophoresed even after the recovery chamber, and thus it is difficult to efficiently recover the target biological substance.

In the configuration in PTL 3, two recovery chambers that are electrically and physically separated are required, and there is a problem that the required area and volume increase accordingly.

In the configurations in PTLs 4 and 5, there is a problem that it is necessary to insert the recovery chamber in the middle of electrophoresis.

In addition, the example in PTL 4 discloses a method in which the recovery chamber is used while being inserted into an electrophoresis flow channel, but there is no countermeasure against the effect of an electroosmotic flow due to an electric double layer generated on a container wall surface at that time, and there is a possibility that a buffer solution in the recovery chamber is depleted during electrophoresis.

Therefore, an object of the present invention is to provide an electrophoresis apparatus and an electrophoresis method capable of stably separating and recovering a target biological substance with a simple configuration by reducing or preventing one or more of the above defects.

In addition, an object of the present invention is to provide such an electrophoresis apparatus and an electrophoresis method capable of compensating for a decrease in a buffer solution due to an electroosmotic flow and stably maintaining a conduction state.

Solution to Problem

An example of an electrophoresis apparatus according to the present invention includes a separation medium for electrophoretically separating a biological substance, a buffer solution tank containing a buffer solution, a recovery chamber for recovering a target biological substance, a separation wall separating the buffer solution tank and the recovery chamber, the separation wall controlling a flow of a buffer solution between the buffer solution tank and the recovery chamber according to a water level of the buffer solution, a position detector that detects a position of the target biological substance that is electrophoresed in the separation medium, and a water level control unit that controls the water level of the buffer solution in the buffer solution tank according to the position of the target biological substance.

An example of an electrophoresis method according to the present invention is an electrophoresis method using an electrophoresis apparatus including a separation medium for electrophoretically separating a biological substance, a buffer solution tank containing a buffer solution, a recovery chamber for recovering a target biological substance, a separation wall separating the buffer solution tank and the recovery chamber, the separation wall controlling a flow of a buffer solution between the buffer solution tank and the recovery chamber according to a water level of the buffer solution, a position detector that detects a position of the target biological substance that is electrophoresed in the separation medium, and a water level control unit. The electrophoresis method includes causing the water level control unit to control the water level of the buffer solution in the buffer solution tank according to the position of the target biological substance.

Advantageous Effects of Invention

According to the electrophoresis apparatus and the electrophoresis method according to the present invention, a target biological substance can be stably separated and recovered with a simple configuration.

In addition, it is possible to compensate for a decrease in a buffer solution during electrophoretic separation due to an electroosmotic flow with a simple configuration and to stably maintain a conduction state.

BRIEF DESCRIPTION OF DRAWINGS

FIG. 3 is a schematic diagram illustrating an example of a positional relationship of a separation wall.

DESCRIPTION OF EMBODIMENTS

Figure 1:
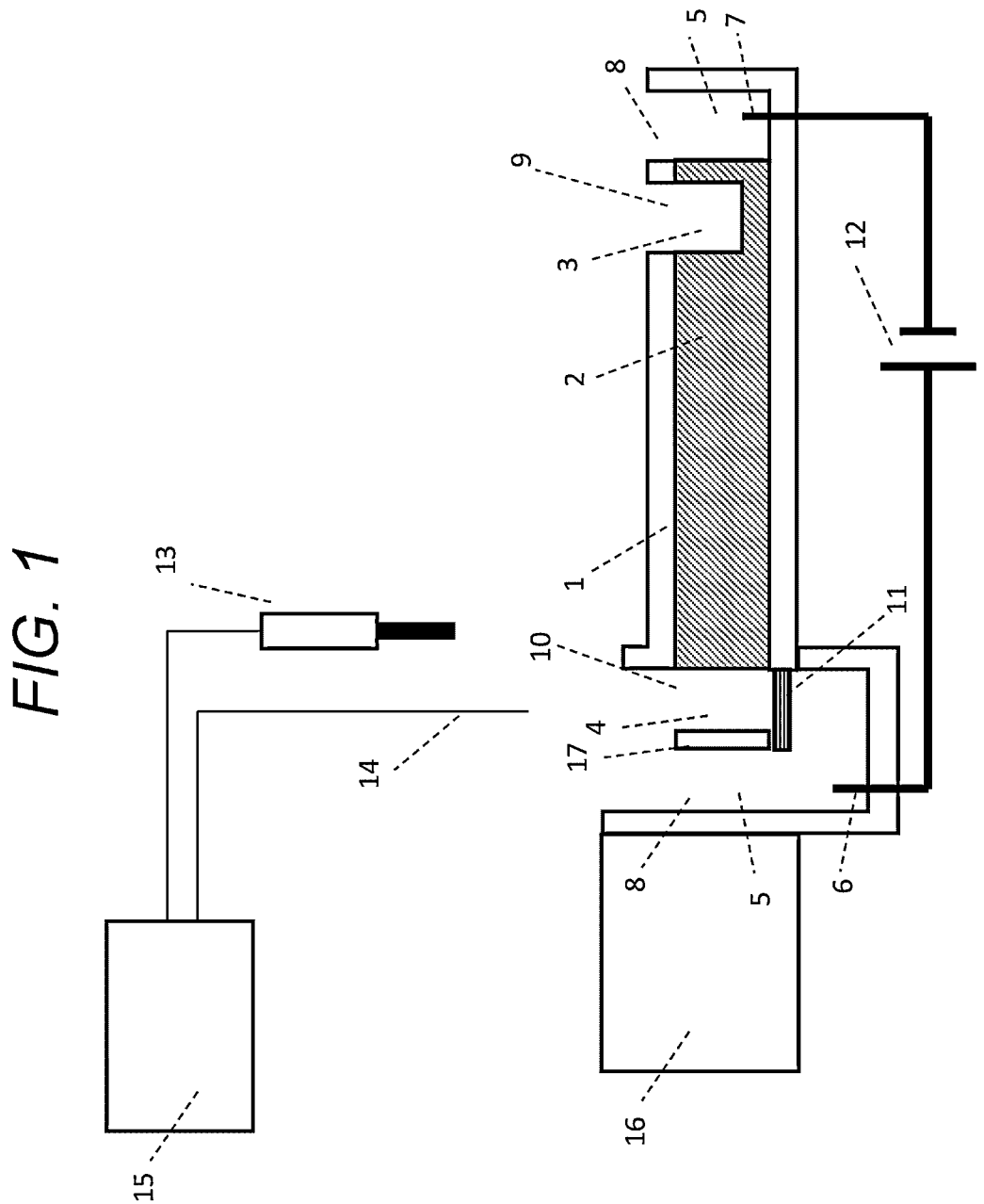
FIG. 1 is a vertical cross-sectional view of an electrophoresis apparatus according to a first embodiment of the present invention.

In all the drawings for describing embodiments, members having the same functions are denoted by the same reference signs, and repeated description thereof may be omitted. Further, the present invention is not to be construed as being limited to the description of the embodiments described below. Although the present invention is defined by the appended claims, it is easily understood by those skilled in the art that the specific configuration thereof can be changed without departing from the spirit or gist thereof.

Positions, sizes, shapes, ranges, and the like of components illustrated in the drawings and the like may not represent actual positions, sizes, shapes, ranges, and the like in order to facilitate understanding of the invention. Therefore, the present invention is not necessarily limited to the positions, sizes, shapes, ranges, and the like disclosed in the drawings and the like. Components expressed in the singular herein are intended to include the plural unless the context clearly dictates otherwise.

First Embodiment

An electrophoresis apparatus and an electrophoresis method according to a first embodiment will be described with reference to FIGS. 1 to 5.

FIG. 1 illustrates a configuration of the electrophoresis apparatus according to the first embodiment. In the example of FIG. 1, a separation medium is a gel 2, and a support 1 covering the gel 2 is provided. The support 1 has an electrically resistive property (for example, an insulating property. The same applies hereinafter).

The electrophoresis apparatus includes a positive electrode 6 and a negative electrode 7 for applying a voltage. A power source 12 is connected to the positive electrode 6 and the negative electrode 7 such that the power source 12 can apply a voltage between the positive electrode 6 and the negative electrode 7. Although not illustrated, a voltage control device that controls the operation of the power source 12 may be connected to the power source 12.

In the following, a case where a biological substance (target biological substance) to be recovered is a nucleic acid will be described as an example. Since the nucleic acid is negatively charged, the direction of electrophoresis is opposite to the direction of an electric field, and the nucleic acid is electrophoresed from the negative electrode 7 side toward the positive electrode 6 side. When a positively charged biological substance is to be recovered, the arrangement of the positive electrode 6 and the negative electrode 7 is reversed in the electrophoresis apparatus.

The gel 2 is an example of a separation medium for electrophoretically separating a biological substance, and is used, for example, for separating a target biological substance and an unnecessary substance. As the gel 2, for example, a known gel such as an agarose gel or a polyacrylamide gel can be used. The thickness of the gel 2 is not particularly limited, but is preferably in a range of 2 to 18 mm from the viewpoint that the band of the biological substance obtained by electrophoresis is sharp and easy to visually recognize. The thickness of the gel 2 may not be constant.

In connection with the gel 2, an injection chamber 3 is provided. The injection chamber 3 is a structure for injecting a sample containing the target biological substance, and a mixture of biological substances having various molecular weights can be injected into the injection chamber 3. In the present embodiment, the injection chamber 3 is formed as a recess opened toward an upper surface at one end of the gel 2 or in the vicinity thereof. By providing the injection chamber 3, an injection operation can be easily performed.

The biological substance is injected into the injection chamber 3 as an injection solution mixed with a liquid having a specific gravity larger than that of a buffer solution 5. Examples of a solvent in which the biological substance is mixed include an aqueous glycerol solution and sugar water. When the solvent is an aqueous glycerol solution, the glycerol concentration can be, for example, 6%. The viscosity of the injection solution can be, for example, 1 mPa·s.

The recovery chamber 4 is a structure for recovering a separated target biological substance (for example, a biological substance having a target molecular weight). In the present embodiment, the recovery chamber 4 is formed as a recess opened toward an upper surface at one end of the gel 2 (however, the end opposite to the injection chamber 3) or in the vicinity thereof. By providing the recovery chamber 4, a recovery operation can be easily performed.

The interval between the injection chamber 3 and the recovery chamber 4 can be arbitrarily set, but the recovery chamber 4 is preferably provided in the vicinity of a position where a biological substance having a target molecular weight appears as a band during or after electrophoresis. This position can be appropriately according to the composition (for example, gel concentration) of the separation medium, the molecular weight of the target biological substance, the molecular weight of an unnecessary substance (for example, a substance to be discarded separately from the target biological substance), the electrophoresis time, and the like.

Further, in the present embodiment, a part (one surface) of the side surface of the recovery chamber 4 is constituted by an end surface of the gel 2, and the other part is constituted by a structure other than the gel 2. Specifically, the rest of the side surface is constituted by the support 1. However, the specific configuration of the recovery chamber 4 is not limited thereto, and for example, the entire side surface of the recovery chamber 4 can be constituted by the gel 2.

Examples of a method for forming the injection chamber 3 and the recovery chamber 4 include, but are not particularly limited to, a method in which a comb is inserted before the gel 2 is solidified, a method in which the solidified gel 2 is excised to form the injection chamber 3 and the recovery chamber 4, and a method in which the solidified gel 2 is melted by applying heat to form the injection chamber 3 and the recovery chamber 4.

The support 1 has an upper opening 9 forming the opening of the injection chamber 3 and an upper opening 10 forming the opening of the recovery chamber 4. The support 1 can be configured as an electrically resistive container (chamber), and can be shaped to cover, for example, the gel 2, the injection chamber 3, and the recovery chamber 4. The support 1 is provided to appropriately form a path for a current while physically supporting the separation medium.

In the present embodiment, the injection chamber 3 and the recovery chamber 4 are substantially rectangular parallelepipeds, but the structures, shapes, sizes, and the like thereof are not limited to those illustrated in the drawings. The structures, shapes, sizes, and the like of the injection chamber 3 and the recovery chamber 4 can be arbitrarily set. Dimensions of the injection chamber 3 and the recovery chamber 4 in the width direction (that is, the horizontal dimensions orthogonal to the direction of the electric field not illustrated in FIG. 2) may be equal or different. In addition, it is also possible not to provide the injection chamber 3 depending on a structure at a position where the sample is injected.

The recovery chamber 4 is configured to be able to contain a solvent. The solvent is capable of suspending the target biological substance. When the target biological substance is present in the recovery chamber 4, it is possible to recover the target biological substance together with the solvent by recovering the solution in the recovery chamber 4.

A buffer solution tank 8 for storing the buffer solution 5 is provided at or near the positive electrode side end and the negative electrode side end of the separation medium. The buffer solution tank 8 on the negative electrode side is provided for the negative electrode 7. The negative electrode 7 is immersed in the buffer solution 5 in the buffer solution tank 8. The buffer solution tank 8 on the positive electrode side is provided for the positive electrode 6. The positive electrode 6 is immersed in the buffer solution 5 in the buffer solution tank 8. Although specific structures of the positive electrode 6 and the negative electrode 7 are not particularly illustrated in FIG. 1, those skilled in the art can appropriately dispose the positive electrode 6 and the negative electrode 7 in such a way that an electric field is generated in the electrophoresis apparatus.

The recovery chamber 4 is provided adjacent to the buffer solution tank 8 on the positive electrode side. A separation wall 17 is disposed between the buffer solution tank 8 on the positive electrode side and the recovery chamber 4. The separation wall 17 separates the buffer solution tank 8 and the recovery chamber 4. In the example illustrated in FIG. 1, a portion of the buffer solution tank 8 at a height position from the upper end to the lower end of the separation wall 17 is separated from the recovery chamber 4 by the electrically resistive separation wall 17.

The separation wall 17 is arranged to control the flow of the buffer solution 5 between the buffer solution tank 8 and the recovery chamber 4 according to the water level of the buffer solution 5.

Figure 3:
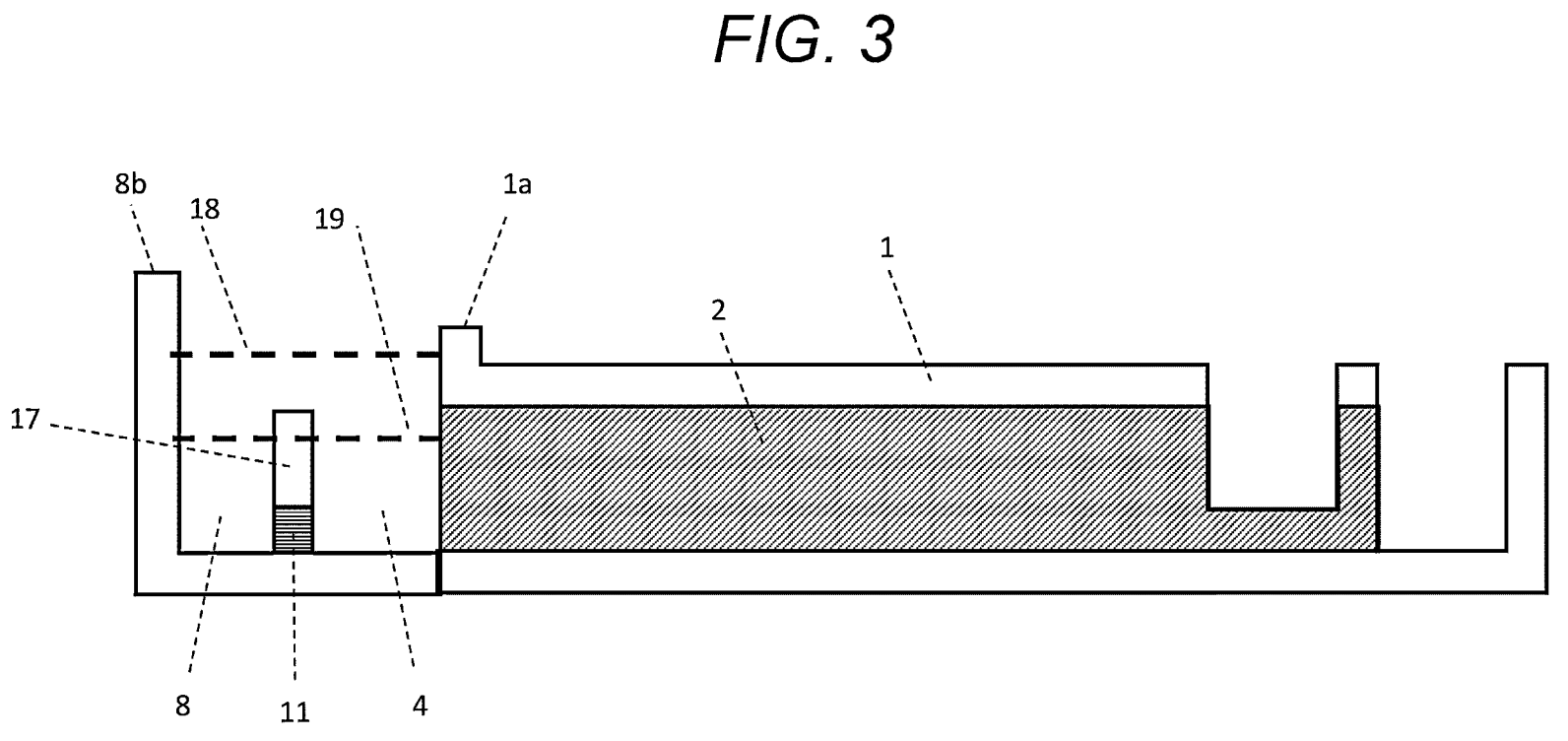

FIG. 3 is a schematic diagram illustrating an example of a positional relationship between the recovery chamber 4, the buffer solution tank 8, and the separation wall 17. In the example illustrated in FIG. 3, the upper end of the separation wall 17 is provided at the same height position as that of the upper end of the gel 2. The upper end of the separation wall 17 is disposed at a position lower than an upper end 1a of a portion of the support 1 constituting the recovery chamber 4 and an upper end 8b of the buffer solution tank 8. With this arrangement, the water level of the buffer solution 5 can reach a position (for example, a liquid level 18) higher than the upper end of the separation wall 17.

When the water level of the buffer solution 5 is at the liquid level 18, the buffer solution 5 can freely enter and leave between the buffer solution tank 8 and the recovery chamber 4. When the water level of the buffer solution 5 is at a liquid level 19, the buffer solution 5 is prevented from entering and leaving between the buffer solution tank 8 and the recovery chamber 4.

Of course, even in a case where the water level of one of the buffer solution tank 8 and the recovery chamber 4 is at the liquid level 19, when the water level of the other reaches the upper end of the separation wall 17, it can move beyond the separation wall 17 from the side where the water level is higher to the side where the water level is lower.

As described above, when the water level of the buffer solution 5 is higher than the upper end of the separation wall 17, the buffer solution 5 can freely move between the buffer solution tank 8 and the recovery chamber 4 without being hindered by the separation wall 17. In this case, the water level of the buffer solution tank 8 is equal to the water level of the recovery chamber 4.

On the other hand, when the water level of the recovery chamber 4 is lower than the upper end of the separation wall 17, the buffer solution 5 is prohibited from moving from the recovery chamber 4 to the buffer solution tank 8. When the water level of the buffer solution tank 8 is lower than the upper end of the separation wall 17, the buffer solution 5 is prohibited from moving from the buffer solution tank 8 to the recovery chamber 4. In this way, the flow of the buffer solution 5 between the buffer solution tank 8 and the recovery chamber 4 is controlled.

In the example illustrated in FIG. 1, the upper end of the separation wall 17 is provided at the same height as an upper end of a portion of the gel 2 facing the recovery chamber 4. By providing the upper end of the separation wall 17 at such a height or a position higher than this, it is possible to prohibit the movement of liquid (buffer solution 5 or other solvent) between the buffer solution tank 8 and the recovery chamber 4 while immersing the entire portion of the gel 2 facing the recovery chamber 4 in the buffer solution.

Figure 4:
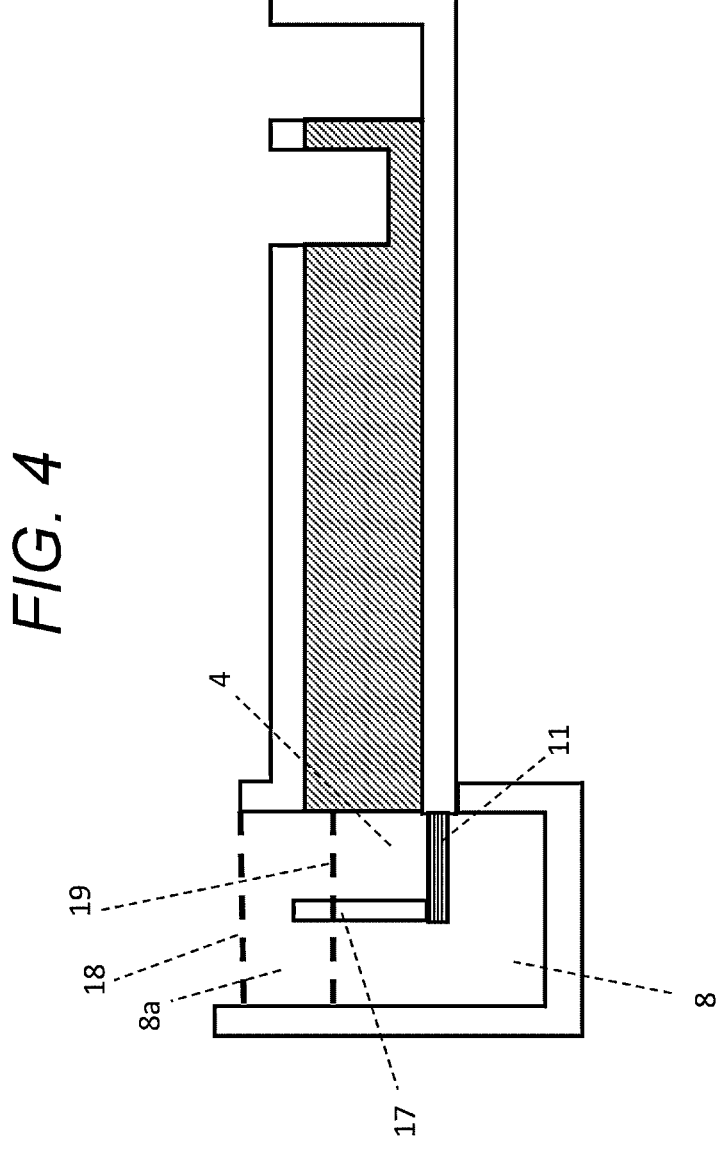
FIG. 4 is a schematic diagram illustrating another example of the positional relationship of the separation wall.

FIG. 4 is a schematic diagram illustrating another example of the positional relationship between the recovery chamber 4, the buffer solution tank 8, and the separation wall 17. In this example, it is also possible to provide at least a portion of the buffer solution tank 8 so as to overlap at least a portion of the recovery chamber 4 as viewed in the vertical direction.

In the example illustrated in FIG. 4, a portion of the buffer solution tank 8 is provided on the side of the recovery chamber 4. The buffer solution tank 8 has an opening 8a opened upward. By providing the opening 8a, an operation of supplying the buffer solution 5 to the buffer solution tank 8 can be easily performed.

A recovery membrane 11 is disposed on the bottom surface of the recovery chamber 4, and the recovery chamber 4 communicates with the buffer solution tank 8 via the recovery membrane 11. That is, one surface of the recovery membrane 11 is in contact with the solvent or solution in the recovery chamber 4, and the other surface of the recovery membrane 11 is in contact with the buffer solution 5 in the buffer solution tank 8.

Figure 2:
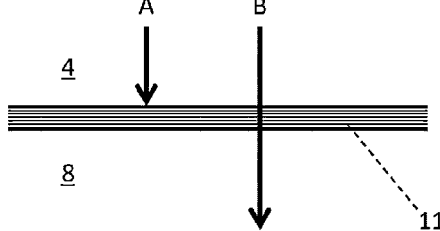
FIG. 2 is a schematic diagram illustrating an example of properties of a recovery membrane in FIG. 1.

FIG. 2 is a schematic diagram illustrating an example of properties of the recovery membrane 11. The properties of the recovery membrane 11 may be arbitrary, but from the viewpoint of efficiently recovering only the target biological substance, it is preferable that the target biological substance remain in the recovery chamber 4 as indicated by an arrow A and ions other than the target biological substance permeates the buffer solution tank 8 as indicated by an arrow B.

As an example, it is preferable that the recovery membrane 11 inhibit the permeation of the target biological substance, and it is more preferable that the recovery membrane 11 substantially prevent the permeation of the target biological substance. As another example, it is preferable that the recovery membrane 11 allow ions other than the target biological substance to permeate, and it is more preferable that the recovery membrane 11 do not substantially inhibit the permeation. As another example, it is preferable that the recovery membrane 11 be a selectively permeable membrane, and the recovery membrane 11 be configured such that the transmittance of the recovery membrane 11 with respect to the target biological substance is lower than the transmittance of the recovery membrane 11 with respect to other ions (that is, ions other than the target biological substance) of at least one type. The properties in the above examples may be combined.

In addition, the recovery membrane 11 can be configured to inhibit the permeation of the buffer solution 5. Since the buffer solution tank 8 and the recovery chamber 4 are separated by the separation wall 17 and the recovery membrane 11, the configuration of the recovery chamber 4 can be simplified, and for example, the positive electrode 6 can be installed outside the recovery chamber 4.

Note that the separation wall 17 can be made of, for example, a resin, but a configuration in which the separation wall 17 is made of the same material as that of the recovery membrane 11 (in such a configuration, it can be said that the recovery membrane 11 also functions as the separation wall 17) is not excluded.

A position detector 13 (FIG. 1) is a structure for detecting the position of the target biological substance that is electrophoresed in the gel 2. A method of the position detection can be arbitrarily selected. For example, a camera, a photodiode, or the like can be used. In FIG. 1, the position detector 13 is disposed above the gel 2, but may be disposed below the gel 2, embedded in the support 1, or the like, and is not particularly limited.

A liquid level detector 14 is a structure for detecting the water level of the buffer solution 5 in the recovery chamber 4, that is, the liquid level position. A method of the liquid level detection can be arbitrarily selected. For example: a non-contact liquid level sensor such as an ultrasonic type, a radio type, or a laser type; an electrode type liquid level sensor; a camera; or the like, can be used. The liquid level detector 14 is disposed above the recovery chamber 4 in FIG. 1, but may be disposed below the recovery chamber 4 or may be inserted into the recovery chamber 4, and is not particularly limited.

The water level control unit 15 is a structure for determining, according to a predetermined determination rule, an amount by which the water level is to be changed, based on a detected value (for example, the position of the target biological substance) of the position detector 13 and, in some cases, based on a detected value (for example, the liquid level position) of the liquid level detector 14, and controlling pouring and draining. When it is determined that the pouring or the draining is to be performed, the information is transmitted to a pouring/draining unit 16, and an operation for the pouring or the draining is performed.

The pouring/draining unit 16 is a structure for pouring and draining water according to the control of the water level control unit 15. The pouring/draining unit 16 is configured to pour/drain water into/from the buffer solution tank 8. By providing the pouring/draining unit 16, the water level can be actively controlled. A specific configuration example of the pouring/draining unit 16 will be described later with reference to FIG. 6.

Figure 5:
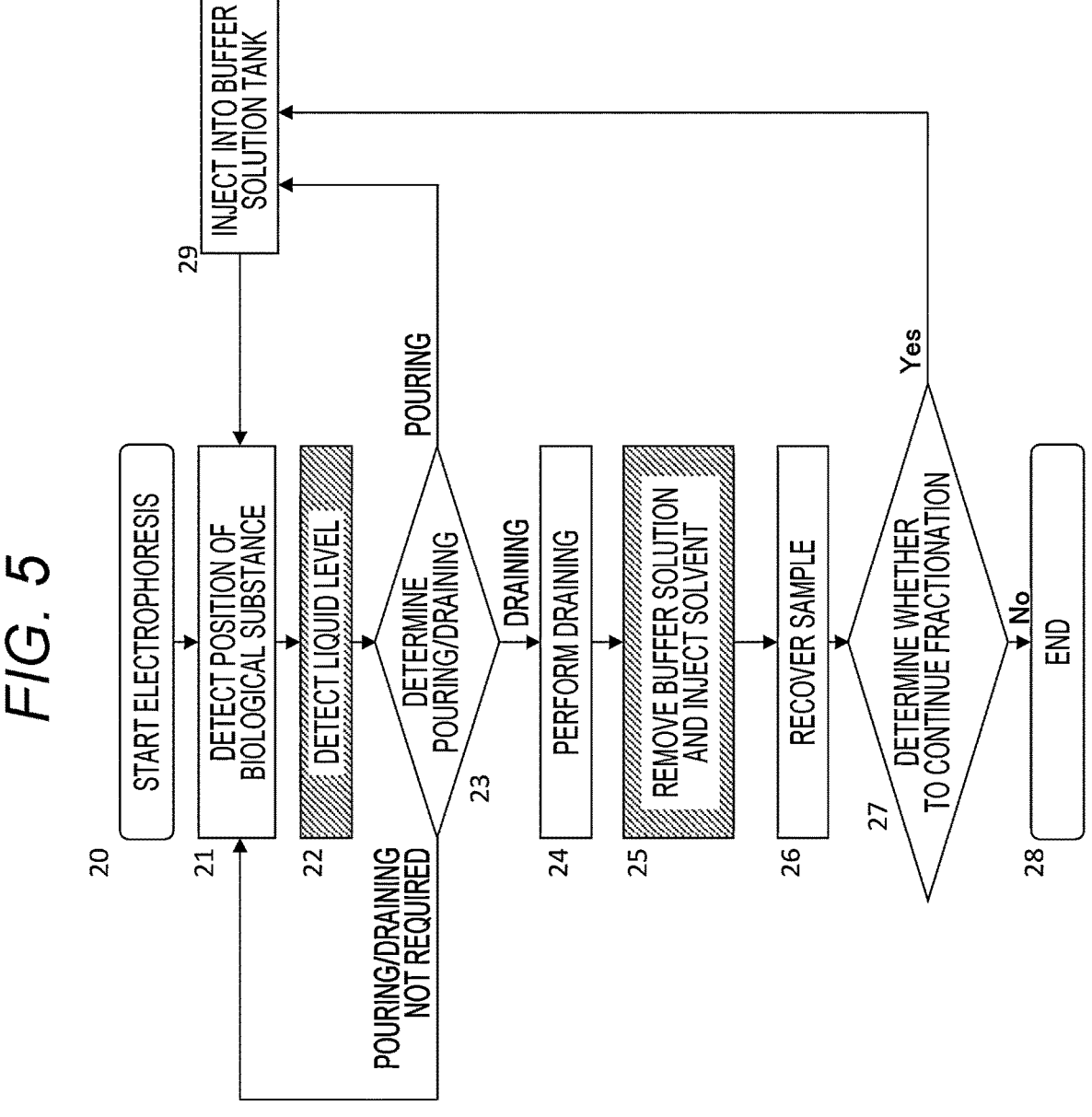
FIG. 5 is a workflow diagram illustrating a recovery method using the electrophoresis apparatus in FIG. 1.

Next, a separation and recovery workflow by the electrophoresis apparatus in FIG. 1 will be described with reference to FIG. 5. This workflow relates to the electrophoresis method, and particularly represents the electrophoresis method using the above-described electrophoresis apparatus. Steps (steps 22 and 25 to be described later) hatched in FIG. 5 can be omitted in a modification.

The electrophoresis method according to the present embodiment includes steps 20 to 29.

Step 20 is a step in which the power source 12 applies an electric field passing through the injection chamber 3 and the recovery chamber 4 to perform electrophoresis. Although step 20 indicates only the initial start timing of the electrophoresis, the timing of stopping or ending the electrophoresis can be appropriately designed by those skilled in the art. For example, it may stop immediately before step 24 described later, may restart immediately after step 25, and may stop again immediately before step 26.

Step 21 is a step of detecting the position of the target biological substance that is electrophoresed in the gel in order to determine the timing of performing pouring or draining. For example, the position of the target biological substance can be detected continuously or intermittently during the electrophoresis. In addition, whether or not the target biological substance has passed through a specific position may be detected. By detecting the position of the target biological substance, for example, it can be determined whether or not the target biological substance has reached the vicinity of the recovery chamber 4 (for example, a region where the distance from the recovery chamber 4 is within a predetermined value).

Step 22 is a step in which the liquid level detector 14 detects the liquid level position of the recovery chamber 4.

As a modification, the liquid level detector 14 may detect the liquid level position of the buffer solution tank 8 instead of or in addition to the liquid level position of the recovery chamber 4.

Step 23 is a step in which the water level control unit 15 controls the water level of the buffer solution 5 in the buffer solution tank 8 on the positive electrode side according to the position of the target biological substance together with step 29 described later. The water level control unit 15 may further determine, according to the liquid level position of the buffer solution, an amount by which the water level of the buffer solution in the buffer solution tank 8 is to be changed. As a result, the water level in the buffer solution tank 8 is controlled. Here, if the control according to the liquid level position of the buffer solution 5 is not performed, step 22 can be omitted.

In step 23, when the target biological substance has not reached the vicinity of the recovery chamber 4 (alternatively, when the target biological substance has not reached the vicinity of the recovery chamber 4 and the liquid level in the recovery chamber 4 is lower than the upper end of the separation wall 17), the water level control unit 15 determines to perform step 29.

Step 29 is a step in which the water level control unit 15 injects a buffer solution into the buffer solution tank 8. The water level control unit 15 may continuously inject the buffer solution until the water level of the buffer solution tank 8 or the recovery chamber 4 reaches a predetermined height exceeding the upper end of the separation wall 17.

With the progress of electrophoresis, the buffer solution in the recovery chamber 4 is reduced by the electroosmotic flow, but a sufficient buffer solution is supplied into the recovery chamber 4 by performing step 29, and thus a stable conduction state can be maintained.

When the amount of decrease in the buffer solution in the recovery chamber 4 due to the electroosmotic flow can be predicted, the amount of the buffer solution to be supplied can be determined accordingly. Further, when the liquid level detector 14 is provided, the water level control unit 15 can determine, according to the liquid level position, an amount by which the water level is to be changed, and thus the amount to be supplied can be determined more appropriately.

After performing step 29, the process returns to step 21.

In step 23, if the target biological substance has reached the vicinity of the recovery chamber 4, the water level control unit 15 determines to perform step 24.

Step 24 includes a step in which the water level control unit 15 lowers the water level of the buffer solution 5 in the buffer solution tank 8 before the target biological substance reaches the recovery chamber 4, thereby prohibiting the movement of the buffer solution 5 between the buffer solution tank 8 and the recovery chamber 4.

The water level of the buffer solution can be lowered, for example, by discharging the buffer solution from the buffer solution tank 8. The amount of the buffer solution to be discharged is such an amount that the liquid level in the buffer solution tank 8 becomes lower than the upper end of the separation wall 17, whereby the movement of the buffer solution between the buffer solution tank 8 and the recovery chamber 4 is prohibited. A specific value of such an amount may be designed in advance, or may be automatically calculated by the water level control unit 15 according to the liquid level position of the buffer solution in the recovery chamber 4.

Step 25 is a step of removing the buffer solution in the recovery chamber 4 and then injecting a solvent for recovering the target biological substance into the recovery chamber 4. This step can be performed manually, for example. As described above, by removing the buffer solution in the recovery chamber 4, an unnecessary substance (for example, an unintended biological substance) that has reached the recovery chamber 4 earlier than the target biological substance can be removed, and thus the concentration of the target biological substance in the solution to be recovered can be improved.

Optionally, after removing the buffer solution and before injecting the solvent, a step of cleaning the recovery chamber 4 using a cleaning liquid and a step of removing the cleaning liquid from the recovery chamber 4 may be included. The steps related to the cleaning may be performed by a human, or may be configured to be automatically performed by the electrophoresis apparatus. By performing the cleaning, the concentration of the target biological substance in the solution to be recovered can be further improved.

Step 25 can be omitted depending on conditions (for example, the type of the target biological substance or the content of the subsequent processing).

Step 26 is a step (recovery step) in which a user recovers the target biological substance that has reached the recovery chamber 4 from the recovery chamber 4. For example, the user recovers the target biological substance by acquiring a sample solution in the recovery chamber 4.

Step 27 is a step of determining whether another target biological substance is present. In a case where another target biological substance is present in step 27, step 29 is performed, and then the process from step 21 is repeated. By such repetition, a plurality of types of target biological substances can be fractionated and recovered in ascending order of molecular weight. In a case where no other target biological substance is present in step 27, the process in FIG. 5 ends in step 28.

Figure 6:
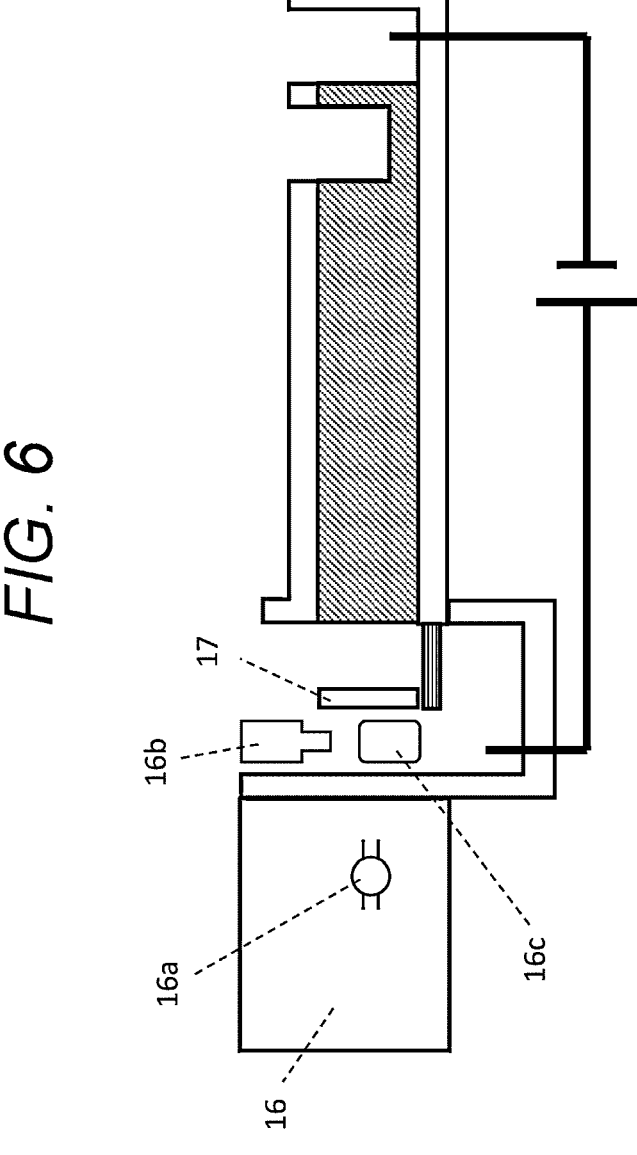
FIG. 6 is a schematic view illustrating a specific configuration example of a pouring/draining unit.

FIG. 6 illustrates a specific configuration example of the pouring/draining unit 16. The pouring/draining unit 16 includes, for example, any one or more of a regulating valve 16a, a dispenser 16b, a weight 16c, a pump (not illustrated), and the like.

If the regulating valve 16a is used, the regulating valve 16a can be provided at a position lower than the upper end of the separation wall 17. According to such a configuration, when the water level of the buffer solution tank 8 is higher than the upper end of the separation wall 17, the regulating valve 16a is opened to discharge water, so that the water level of the buffer solution tank 8 can be lowered to a position lower than the upper end of the separation wall 17. By using the regulating valve 16a, the internal structure of the buffer solution tank 8 can be simplified.

If the dispenser 16b is used, the water level of the buffer solution tank 8 can be raised and lowered by disposing a nozzle of the dispenser 16b in the buffer solution tank 8 and sucking or dispensing the buffer solution 5. By using the dispenser 16b, the liquid amount can be controlled more precisely.

The weight 16c is an example of a space occupying member disposed in the buffer solution tank 8. The weight and specific gravity of the weight 16c are not limited. The material and shape of the weight 16c can be appropriately designed. The water level control unit 15 can control the water level by moving up and down the weight 16c. That is, by lowering the weight 16c to increase the space occupied by the weight 16c below the liquid level, the water level in the buffer solution tank 8 rises. Conversely, by raising the weight 16c to reduce the space occupied by the weight 16c below the liquid level, the water level in the buffer solution tank 8 drops. By using the weight 16*c*, it is not necessary to supply or discharge the buffer solution to or from the buffer solution tank 8 at the time of electrophoresis, or it is possible to suppress the amount to be supplied and the amount to be discharged.

It is also possible to omit the pouring/draining unit 16. In such a case, for example, by moving the gel 2 up and down according to the control of the water level control unit 15, the relative position of the gel 2 with respect to the liquid level may be changed. This makes it possible to relatively change the liquid level position with respect to the gel 2.

As described above, according to the electrophoresis apparatus and the electrophoresis method according to the first embodiment, it is possible to compensate for a decrease in the buffer solution during electrophoresis due to the electroosmotic flow and to maintain the stable conduction state.

In addition, such an effect can be obtained with a simple configuration. For example, there is a conventional configuration in which a flow path for a separation medium is branched (PTL 3 and the like), but as compared with such a configuration, in the electrophoresis apparatus according to the first embodiment of the present invention and the related biological substance recovery method, the flow path for the separation medium can be made serial, so that the volume required for processing one sample can be reduced, and the configuration is simplified.

EXAMPLE

An example of the first embodiment will be described below.

(Preparation of Electrophoretic Gel)

An agarose gel having an injection chamber 3 and a recovery chamber 4 was prepared. The agarose gel was molded by injecting 3% SeaKem (registered trademark) GTG-TAE (manufactured by Lonza) into a support of a plastic container. The injection chamber 3 was formed to have an opening with dimensions of 1 mm×5 mm and a depth of 3 mm, and the recovery chamber 4 was formed to have an opening with dimensions of 2 mm×5 mm and a depth of 4 mm by inserting a comb before agarose gel solidified. The distance between the injection chamber 3 and the recovery chamber 4 was 20 mm.

(Electrophoresis)

1×TAE buffer solution (TrisAcetate EDTA Buffer) was injected into the buffer solution tank 8 of both electrodes. The insides of the injection chamber 3 and the recovery chamber 4 were also filled with TAE buffer solution. Thereafter, 1 µL of 6×DNALoadingDye (manufactured by ThermoFisher Scientific) was mixed with 5 µL of sample solution containing nucleic acids of various lengths to form an injection solution, and the injection solution was injected into the injection chamber 3.

After the injection of the injection solution, a voltage of 135 V was applied to perform electrophoresis.

Next, the position of a biological substance was detected, and the liquid level position was detected this time when the nucleic acid of the target length was present just before the recovery chamber 4. The amount of the buffer solution to be removed from the buffer solution tank was determined according to the liquid level position.

According to the determined amount to be removed, the buffer solution in the buffer solution tank was removed by the dispenser, and the movement of the buffer solution between the buffer solution tank and the recovery chamber was blocked.

Subsequently, the buffer solution in the recovery chamber 4 was removed, 40 µL of distilled water was injected, pipetted 20 times and then removed, and the recovery chamber was cleaned. Next, 40 µL of distilled water was injected as a solvent.

The voltage was stopped after the nucleic acid of the target length entered the recovery chamber, and the nucleic acid solution was obtained.

The obtained solution was quantified using a nucleic acid quantifier TapeStation 4200 (Agilent Technologies, Ltd.). From the quantification results, it was confirmed that 80% of the target nucleic acid was recovered without contamination.

REFERENCE SIGNS LIST

1 support
2 gel (separation medium)
3 injection chamber
4 recovery chamber
5 buffer solution
6 positive electrode
7 negative electrode
8 buffer solution tank (8*a* opening)
9, 10 upper opening
11 recovery membrane
12 power source
13 position detector
14 liquid level detector
15 water level control unit
16 pouring/draining unit
16*a* regulating valve
16*b* dispenser
16*c* weight (space occupying member)
17 separation wall
18 liquid level
19 liquid level

The invention claimed is:

1. An electrophoresis apparatus comprising:
   a separation medium for electrophoretically separating a biological substance;
   a buffer solution tank containing a buffer solution;
   a recovery chamber for recovering a target biological substance;
   a separation wall separating the buffer solution tank and the recovery chamber, the separation wall controlling a flow of the buffer solution between the buffer solution tank and the recovery chamber according to a water level of the buffer solution;
   a position detector that detects a position of the target biological substance that is electrophoresed in the separation medium; and
   a water level control unit that controls the water level of the buffer solution in the buffer solution tank according to the position of the target biological substance.

2. The electrophoresis apparatus according to claim 1, further comprising a liquid level detector that detects a liquid level position of the buffer solution,
   wherein the water level control unit determines, according to the position of the target biological substance and the liquid level position, an amount by which the water level is to be changed.

3. The electrophoresis apparatus according to claim 1, further comprising a pouring/draining unit that performs pouring/draining according to the control of the water level control unit.

4. The electrophoresis apparatus according to claim 3, wherein the pouring/draining unit includes a regulating valve, and the regulating valve is located at a position lower than an upper end of the separation wall.

5. The electrophoresis apparatus according to claim 3, wherein the pouring/draining unit includes a dispenser.

6. The electrophoresis apparatus according to claim 1, wherein the water level control unit controls the water level by moving up and down a space occupying member disposed in the buffer solution tank.

7. The electrophoresis apparatus according to claim 1, wherein an upper end of the separation wall is provided at the same height as an upper end of a portion of the separation medium facing the recovery chamber, or is provided at a higher position than the upper end of the portion of the separation medium facing the recovery chamber.

8. An electrophoresis method using an electrophoresis apparatus including:

a separation medium for electrophoretically separating a biological substance;

a buffer solution tank containing a buffer solution;

a recovery chamber for recovering a target biological substance;

a separation wall separating the buffer solution tank and the recovery chamber, the separation wall controlling a flow of the buffer solution between the buffer solution tank and the recovery chamber according to a water level of the buffer solution;

a position detector that detects a position of the target biological substance that is electrophoresed in the separation medium; and a water level control unit, the electrophoresis method comprising causing the water level control unit to control the water level of the buffer solution in the buffer solution tank according to the position of the target biological substance.

9. The electrophoresis method according to claim 8, further comprising:

discharging a buffer solution in the buffer solution tank;

removing the buffer solution in the recovery chamber; and injecting a solvent into the recovery chamber after removing the buffer solution in the recovery chamber.

* * * * *